(12) United States Patent
Ericsson

(10) Patent No.: US 9,061,360 B2
(45) Date of Patent: Jun. 23, 2015

(54) HUB DEVICE

(75) Inventor: Hans Ericsson, Kalmar (SE)

(73) Assignee: Twinblade Technolgies Holding Sweden AB, Kalmar (SE)

( * ) Notice: Subject to any disclaimer, the term of this patent is extended or adjusted under 35 U.S.C. 154(b) by 952 days.

(21) Appl. No.: 12/312,376

(22) PCT Filed: Nov. 9, 2007

(86) PCT No.: PCT/SE2007/000997
§ 371 (c)(1),
(2), (4) Date: Sep. 2, 2009

(87) PCT Pub. No.: WO2008/057028
PCT Pub. Date: May 15, 2008

(65) Prior Publication Data
US 2010/0018375 A1    Jan. 28, 2010

(30) Foreign Application Priority Data
Nov. 9, 2006 (SE) ........................ 0602394

(51) Int. Cl.
*B23D 45/10* (2006.01)
*B27B 5/32* (2006.01)

(52) U.S. Cl.
CPC . *B23D 45/10* (2013.01); *B27B 5/32* (2013.01); *Y10T 83/9374* (2015.04); *Y10T 83/9469* (2015.04)

(58) Field of Classification Search
USPC ................. 30/369, 503, 502, 503.5; 144/222, 144/231–237; 83/666, 665
See application file for complete search history.

(56) References Cited

U.S. PATENT DOCUMENTS

| | | | |
|---|---|---|---|
| 211,346 A | 1/1879 | Robbins et al. | |
| 431,510 A | 7/1890 | Douglas | |
| 588,082 A * | 8/1897 | Perkins | 144/222 |
| 2,512,970 A * | 6/1950 | Rogne | 83/666 |
| 2,555,428 A | 6/1951 | Tuttle | |
| 2,795,247 A | 6/1957 | Topolinski | |
| 3,406,729 A | 10/1968 | Cooper | |
| 3,440,915 A * | 4/1969 | Weyant | 83/666 |
| 3,927,447 A | 12/1975 | Willinger | |
| 3,945,289 A | 3/1976 | Baez Rios | |
| 4,641,562 A | 2/1987 | Clarke | |
| 4,724,662 A | 2/1988 | Giandenoto et al. | |
| 4,913,022 A | 4/1990 | Kuklinski | |
| 5,743,163 A | 4/1998 | Lavinder | |
| 5,896,800 A | 4/1999 | Curtsinger et al. | |
| 6,135,004 A | 10/2000 | Gebeluis | |

(Continued)

FOREIGN PATENT DOCUMENTS

| | | |
|---|---|---|
| AU | 2009/200212 | 6/2010 |
| CA | 2650190 | 7/2010 |

(Continued)

*Primary Examiner* — Kenneth E. Peterson
(74) *Attorney, Agent, or Firm* — Capitol City TechLaw

(57) ABSTRACT

A hub device for a pair of saw blades, which saw blades are arranged to rotate about the same rotational axis and in an opposite direction to one another. The hub device includes a first blade adapter, which has a support surface for the first saw blade, and a second blade adapter, which has a support surface for the second saw blade and a central fastener for a blade lock, which is arranged to secure both blades. The support surface of the first blade adapter is designed to engage the first saw blade. The support surface of the second blade adapter is designed to engage the second saw blade.

5 Claims, 3 Drawing Sheets

(56) References Cited

U.S. PATENT DOCUMENTS

| | | | |
|---|---|---|---|
| 6,158,323 A | 12/2000 | Asada | |
| 6,450,075 B1 | 9/2002 | Manzo | |
| 6,938,532 B2 | 9/2005 | Hofmann et al. | |
| 6,962,147 B2 | 11/2005 | Hamilton | |
| 7,950,318 B2 | 5/2011 | Ericsson et al. | |
| 8,033,206 B2 * | 10/2011 | Ericsson | 83/835 |
| 8,151,839 B2 * | 4/2012 | Huang | 144/218 |
| 2003/0000717 A1 | 1/2003 | Hofmann et al. | |
| 2003/0136242 A1 * | 7/2003 | Hofmann et al. | 83/853 |
| 2004/0182217 A1 | 9/2004 | Ericsson | |
| 2005/0178264 A1 | 8/2005 | Setliff | |
| 2010/0180454 A1 | 7/2010 | Cheng | |
| 2011/0277612 A1 | 11/2011 | Chen | |

FOREIGN PATENT DOCUMENTS

| | | | |
|---|---|---|---|
| CA | 2703386 | | 11/2011 |
| CN | 101116919 | | 2/2008 |
| CN | 201186366 | | 1/2009 |
| CN | 101486116 | | 7/2009 |
| CN | 201342527 | | 11/2009 |
| DE | 442724 | | 4/1927 |
| DE | 2031846 | | 1/1972 |
| DE | 298 04 220 | * | 6/1998 |
| DE | 29815349 | | 11/1998 |
| DE | 29804220 | | 7/1999 |
| DE | 29813230 | | 11/1999 |
| DE | 298 13 230 | * | 12/1999 |
| DE | 10059978 | | 6/2002 |
| DE | 102009005499 | | 7/2010 |
| EP | 192872 | | 3/1986 |
| FR | 2 192 483 | * | 1/1974 |
| FR | 2192483 | | 8/1974 |
| GB | 766960 | | 1/1957 |
| GB | 2466999 | | 7/2010 |
| GB | 2480071 | | 9/2011 |
| JP | 10118838 | | 5/1998 |
| JP | 10118838 | * | 12/1998 |
| WO | WO 90/06839 | | 6/1990 |
| WO | WO 02/43910 | | 6/2002 |
| WO | WO-02/43910 | | 6/2002 |
| WO | WO 02/092296 | | 11/2002 |
| WO | WO-02/092296 | | 11/2002 |
| WO | WO-02/092298 | | 11/2002 |
| WO | WO 2011/078710 | | 6/2011 |
| WO | WO-2011/084076 | | 7/2011 |

* cited by examiner

HUB DEVICE

TECHNICAL FIELD

The present invention concerns a hub arrangement for a pair of saw blades, which includes a first blade, which is arranged to rotate about a rotational axis in a first direction, and a second blade, which is arranged to rotate about the same rotational axis in a second direction opposite to said first direction, wherein each of the blades has its own blade body and cutting elements along the periphery of each blade body, the cutting elements being arranged to run close to and in parallel with each other during rotation on a distance defined by a spacer means on at least one of the blade bodies, and wherein the first saw blade has a back side and an opposing front side that is intended to be turned towards a back side of the second saw blade, that has an opposing front side too, the hub device including a first blade adapter, which has a support surface for the back side of the first saw blade, a centering flange protruding from the support surface for a centering hole in the first saw blade and protruding drive pegs to engage drive peg notches, which surround the centering hole of the first saw blade, and the hub device further including a second blade adapter, which has a support surface for the back side of the second saw blade and a central fastener for a blade lock, which is arranged to secure both blades.

STATE OF THE ART

A hub device according to the preamble is known from WO02/43910. In the hub device revealed therein, the blade lock is not locked against the second saw blade but against a stub shaft, thus creating two floatingly suspended saw blades. This means that precision can easily be impaired, because the mobility of both is summed up.

In a hub device known from WO02/092296 this problem does not exist. The hub device shown therein is made for a cutting machine, which by means of the hub device drives two saw blades in opposite directions. This gives the advantage that no thrusts occur and in addition it contributes to a very high work speed.

In the known hub device the inner or first blade supports itself loosely on a support surface, but has drive peg notches that securely engage with drive pegs, which protrude from said support surface. Thus the cutting machine can drive the blade without sliding. The outer or second blade is on the other hand screwed right to a blade adapter, that itself is screwed onto a central drive shaft, which is included in the hub device, and thus also forces the first blade against the support surface. In this way the first blade is held securely on its drive pegs, and, thanks to the thread engagement of the hub device with the drive shaft, the second blade can be driven by the cutting machine without any sliding.

It can be concluded from the above that the second known hub device results in the first blade being floatingly suspended, while the second blade is locked. This means that during operation of a cutting machine, the second blade always is guiding the first one, which of course is good for precision. However, when the second blade is loaded sideways this will also affect the first blade, which in practice often results in uneven cuts.

OBJECT OF THE INVENTION

Against this background, the object of the invention is to create a hub device for counter rotating saw blades, that does not have the drawbacks of the known solutions.

SUMMARY OF THE INVENTION

According to the invention, this object is achieved in a hub device according to the preamble by the support surface of the second blade adapter around the rotational axis having at least three ridges for engagement with corresponding notches in the second blade, the ridges having a height that exceeds the thickness of the main blade of the second saw blade, and by the blade lock having a circumferential ring surface facing the support surface of the second blade adapter, wherein the blade lock is arranged to when locked having its support surface abutting against the ridges of the second blade adapter ridges, so that the second blade gets a limited axial mobility against the support surface of the second blade adapter, said mobility being determined by the difference between the height of the ridges and the thickness of the blade body of the second saw blade.

Thanks to this solution according to the invention, an arrangement is created in which the first blade in a known way is floatingly supported, while the second blade instead is semi-locked or semi-floating. This means that the precision drawbacks of two floatingly supported saw blades according to WO02/43910 are limited and that the weak tolerance against skew with one loose and one locked blade is increased.

Preferably the second blade adapter axially is mounted vis-à-vis the first blade adapter so that the distance between the main bodies of the saw blades is less at the centre of the main bodies than at the peripheries of the main bodies, where the distance between the main bodies of the saw blades is determined by said spacer means.

In addition, the blade lock is preferably shaped as a screw nut, which has a capsule-shaped neck, arranged to pass through a corresponding centering hole in the second blade. The advantage of this is that the second blade thus is centred effectively and that the portion of the blade lock protruding from the second blade thus can be made very flat.

BRIEF DESCRIPTION OF THE DRAWINGS

A preferred embodiment of the invention is described more closely in the following with reference to the attached drawings, of which.

DESCRIPTION OF A PREFERRED EMBODIMENT

Figure 4:
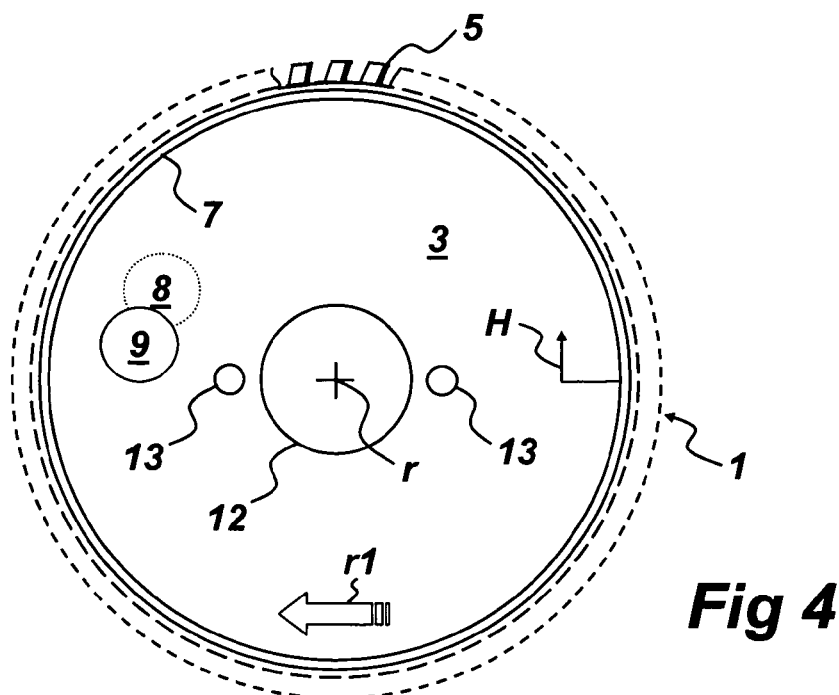
FIG. 4 is a front view of a first saw blade.
Figure 5:
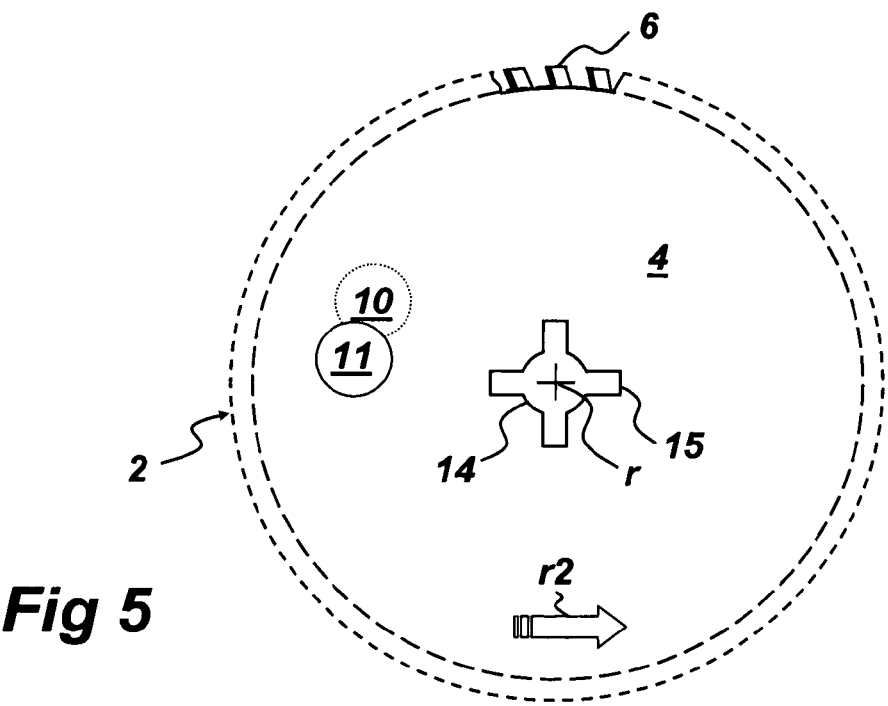
FIG. 5 is a front view of a second saw blade.

A hub device 20 according to a preferred embodiment of the invention is intended for a pair of saw blades according to FIGS. 4 and 5. Said pair includes a first blade 1, which is arranged to rotate around a rotational axis r in a first direction r1, and a second blade 2, which is arranged to rotate around the same rotational axis r in a second direction r2, opposite to said first direction.

Each of these blades 2 has in a known way a blade body 3, 4 and along the periphery of each blade body 3, 4 cutting elements 5, 6, like saw teeth with hard metal cutting edges, which are arranged to run in close proximity and in parallel with each other during the rotation of the blades 1, 2 at a distance determined by a spacer means 7 on the main body 3. The first blade 1 has a back side 8 and an opposite front side 9, which is intended to face a back side 10 of the second blade 2, which also has an opposite front side 11. Typically the spacer means 7 can extend 0.25 mm beyond the front side 9 of the first blade 1 in order to create distance to the back side 10 of the second blade 2.

The hub device 20 includes a first blade adapter 21, which has a support surface 22 for the back side 8 of the first blade 1. From the support surface 22 a centering flange 23 is protruding, which fits into a centering hole 12 in the first blade 1. In addition drive pegs 24 protrude from the support surface 22 for engagement with drive notches 13 on both sides of the centering hole 12 of the first blade. The drive pegs 24 protrude from the support surface 22 a bit shorter than the thickness of the main body 3.

The hub device 20 includes also a second blade adapter 25, which has a support surface 26 for the back side 10 of the second blade 2. The second blade adapter 25 also has a central fastener 27 for a blade lock 28, which is arranged so that it secures both blades 1, 2 and which is described in more detail in below.

Figure 2:
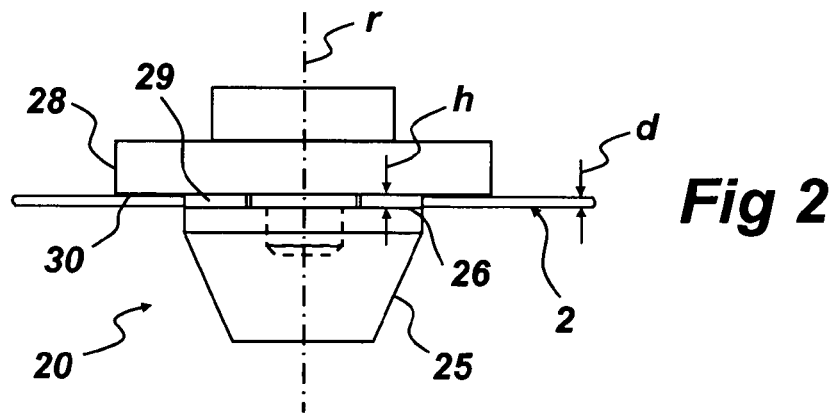
FIG. 2 is a side view of the second blade adapter including the blade lock.
Figure 2A:
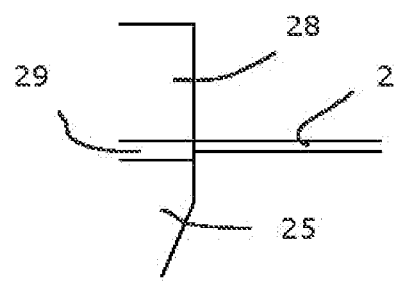
FIG. 2a is an enlarged partial view of FIG. 2.

The support surface 26 of the second blade adapter 25 has in the preferred embodiment four spoke wise protruding ridges 29 symmetrically distributed around the rotational axis r. These ridges 29 are intended for engagement with corresponding notches 15 in the second blade 2 and have a height h which slightly exceeds the thickness d of the main body 4 of the second blade 2. Also see FIG. 2a in which the different heights are more readily apparent.

The blade lock 28, which is also included in the second blade adapter 25, has a circumferential ring surface 30 which faces the support surface 26 of the second blade adapter 25. This ring surface 30 is to abut against the ridges 29 of the second blade adapter 25 when the blade lock 28 is locked with its ring surface 30. In is way the second blade 2 in relation to the support surface 26 of the second blade adapter 25 gets a limited axial mobility, which is determined by the difference between the height h of the ridges 29 h and the thickness d of the main body 4 of the second blade 2. As an example, a typical main body thickness d is 1.50 mm, a typical ridge height h is 1.70 mm and thus a typical axial mobility of 0.20 mm.

Figure 3A:
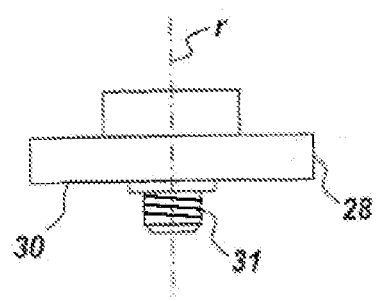
FIG. 3a is another side view of the blade lock showing external threads.

Finally, it is clear from the drawings enclosed that the blade lock 28 can be advantageously fashioned as a screw nut with a capsule-shaped neck 31. See FIG. 3a which shows an external thread provided on the neck 31. This neck 31 is arranged to extend through a corresponding centering hole 14 in the second blade 2 and contributes to a high degree to a compact form for the blade lock 28 on top of the front side 11 of the second blade 2 and to an excellent durability thanks to a long neck 31 hidden inside the hub device 20.

Upon mounting of the two blades 1, 2 it is appropriate to create a certain preload between the blades 1, 2. The preload should be such that it corresponds to a difference between the internal distance of the main bodies 3, 4 at their peripheries and their centers of 0.50 mm. Since the spacer means 7, which creates a distance between the front side 9 of the first blade 1 and the back side 10 of the second blade 2, according to the preceding description extends 0.25 mm beyond the front side 9, at its periphery, the distance between the main bodies 3, 4 of the blades 1, 2 will be about 0.25 mm at the periphery of each of the blades 1, 2. However, at the center of each blade 1, 2 the distance between the blade bodies 3, 4 will only be about 0.20 mm thanks to said preload, which corresponds to 0.05 mm. An appropriate preload, that is a difference between the blade bodies 3, 4 at the periphery and at the center, is preferably 0.02 to 0.10 mm, more preferably 0.03 to 0.07 mm, and most preferably 0.05 mm as indicated above. The appropriate preload described above between the two blades 1, 2 is generated by threading of the second blade adapter 25 into an inner shaft, not shown, to a depth that creates the desired preload, as will be described below.

Figure 1:
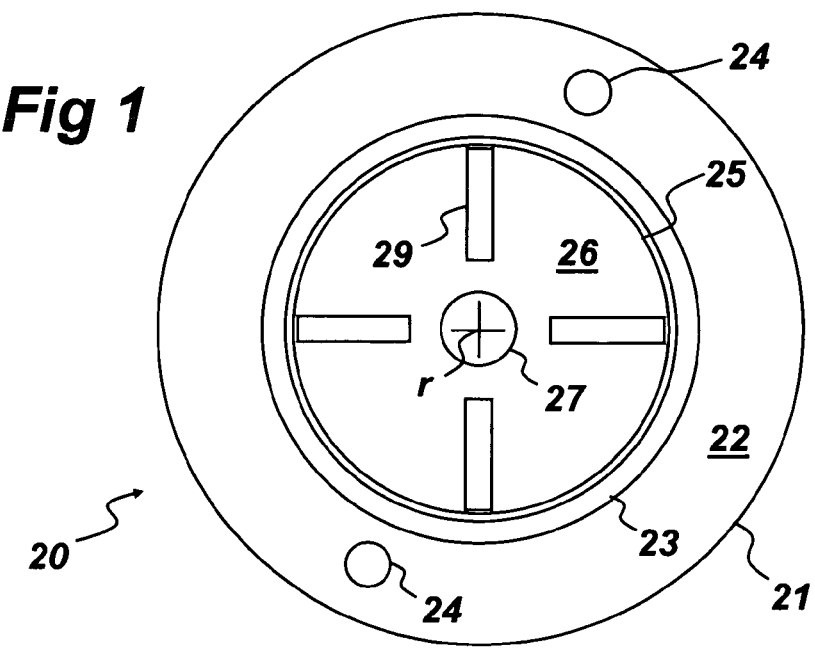
FIG. 1 is an overall view of a hub device according to the invention without a blade lock, the hub device including an outer or first blade adapter and an inner or second blade adapter.
Figure 3:
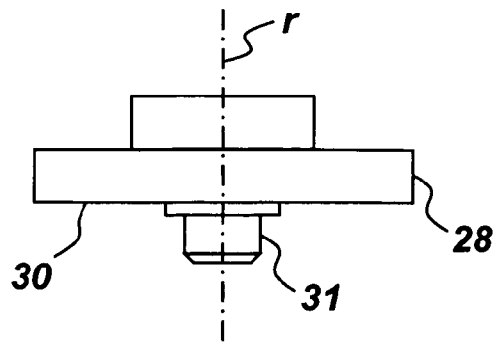
FIG. 3 is a side view of the blade lock only.

A cutting machine, which for example can be of the type shown in FIG. 1 in WO02/43910, has the first blade adapter 21 mounted on an outer shaft in the cutting machine. The second blade adapter 25 is mounted on an inner shaft, which is coaxial with the outer shaft and extends therethrough. Upon mounting of the blades 1, 2 first of all the first blade 1 is placed on the first blade adapter 21, as shown in FIG. 1 in the present application, with the drive pegs 24 extending through the drive peg notches 13. The second blade 2 is then placed on top of the first blade 1 with the ridges 29 on the second blade adapter 25 extending through the notches 15 in the second blade 2. Finally, the blade lock 28 is screwed tight by screwing the neck 31 into the central fastener 27 of the second blade adapter 25, wherein the ring surface 30 comes to abut against front side 11 of the second blade 2. The desired preload is achieved by screwing the ring surface 30 of the blade lock 28 all the way down to a lower level, related to the projection plane of FIG. 1 of the present application, than the support surface 22 of the first blade adapter 21 would reach if the blades 1, 2 were all parallel. Thanks to this difference in level the ring surface 30 will preload the second blade 2 against the first blade 1 when the blade lock 28 is tightened until the ring surface 30 comes into contact with the ridges 29. In this way a mounting of the blades 1, 2 is achieved that allows the second blade 2 to move to some degree axially, because the ridges 29 have a higher height h than the thickness d of the blade body, and yet the second blade 2 is preloaded against the first blade 1. It can be seen that the hub device 20 described above can be varied in different ways within the scope of the patent claims. Thus, for example, other types of drive pegs 24 and another number of ridges 29 can be selected. For example, as an alternative, the drive pegs 24 on the first blade adapter 21 can instead be shaped as ridges that extend from the rotational axis r, which can be of a type similar to the ridges 29 that are arranged on the second blade adapter 25. In such a case the first blade 1 will have notches similar to the notches 15 in the second blade 2.

In addition it is clear that for example the blade lock 28 can be shaped in a different way and could easily be fashioned as a bayonet or lever lock.

The spacer means 7 does preferably extend 0.25 mm beyond the front side 9 of the first blade described above. The distance that the spacer means 7 extends beyond the front side 9 can vary somewhat, appropriately within an interval of 0.10 to 0.5 mm, preferably within the interval of 0.15 to 0.40 mm. It is also possible to supply the front side 9 of the first blade 1 with a spacer means 7, and also to supply the back side 10 of second blade 2 with a similar spacer means, which extends from the back side 10 of the second blade 2 towards the front side 9 of the first blade 1 in order to slide against the spacer means 7, or against the front side 9. Naturally, the spacer means can also be arranged solely on the second blade and not on the first blade according to yet another alternative embodiment.

The ridge height 11 of the ridges 29 can, as described above, be 0.20 mm larger than the blade body thickness d of the blade body 4, which gives an axial mobility of approximately 0.20 mm for the blade body 4 in relation to the support surface 26 and the ring surface 30. Preferably the ridge height h is approximately 0.05 to 0.50 mm, more preferably approximately 0.10 to 0.50 mm, and most preferably approximately 0.15 to 0.25 mm, larger than the blade body thickness d, which entails a corresponding axial mobility for the blade body 4.

To summarize, the invention regards a hub device for a pair of saw blades, which includes a first blade 1, which is arranged to rotate around a rotational axis r in a first direction, and a second blade 2, which is arranged to rotate around the same rotational axis r in a second direction, opposite to the direction of the first blade. The hub device includes a first blade adapter 21, which has a support surface 22 for the first blade 1, and a second blade adapter 25, which has a support surface 26 for the second blade 2 and a central fastener 27 for a blade lock 28, which is arranged to secure both blades 1, 2. The support surface 26 of the second blade adapter 25 has at least three spoke wise extending ridges 29 for engagement with corresponding notches 15 in the second blade 2, said ridges 29 having a height 11 which exceeds the thickness d of the second blade 2. The blade lock 28 has a circumferential support surface 30, which is arranged to abut the ridges 29 of the second blade adapter 25, such that the second blade 2 keeps a limited axial mobility against the support surface 26 of the second blade adapter.

The invention claimed is:

1. A hub device arrangement comprising:
   a first blade configured to rotate about a rotational axis in a first direction, the first blade having a back side and an opposite front side;
   a second blade configured to rotate about the rotational axis in a second direction opposite to the first direction, the second blade having a back side and an opposite front side;
   wherein each of the first and the second blades has a blade body and cutting elements provided along the periphery of the blade body;
   wherein the cutting elements of the first and the second blades are configured to run in parallel with each other during rotation, and spaced apart by a distance determined by a spacer provided on at least one of the blade bodies; and
   wherein the front side of the first blade faces towards the back side of the second blade;
   a first blade adapter including
      a support surface for the back side of the first blade,
      a centering flange protruding from the support surface, the centering flange engaging a centering hole provided in the first blade, and
      protruding drive pegs engaging drive peg notches that surround the centering hole of the first blade; and
   a second blade adapter including
      a support surface for the back side of the second blade, and
      a central fastener for receiving a blade lock to secure the first and the second blades;
   wherein the support surface of the second blade adapter has at least three ridges situated around the rotational axis, the ridges engage with corresponding notches provided in the second blade, and the ridges have a height that exceeds a thickness of the main body of the second blade; and
   wherein the blade lock has a circumferential ring surface that abuts against the ridges of the second blade adapter, such that the second blade has limited axial mobility between the support surface of the second blade adapter and the circumferential ring surface of the blade lock, the limited axial mobility being determined by the difference between the height of the ridges and the thickness of the blade body of the second blade.

2. The hub device arrangement according to claim 1, wherein the second blade adapter is axially mounted relative to the first blade adapter, such that the distance between the blade bodies of the first and the second blades is less at the centers of the blade bodies than at the peripheries of the blade bodies;
   wherein the distance between the blade bodies at the peripheries of the blade bodies is determined by the spacer; and
   wherein the second blade adapter is threaded onto an inner shaft.

3. The hub device arrangement according to claim 2, wherein the distance between the blade bodies at the centers of the blade bodies is 0.02 to 0.10 mm less than at the peripheries of the blade bodies where the spacer is provided.

4. The hub device arrangement according to claim 1, wherein the blade lock is shaped as a screw nut with a neck passing through a corresponding centering hole provided in the second blade.

5. The hub device arrangement according to claim 1, wherein the drive pegs of the first blade adapter protrude from the support surface a distance that is less than the thickness of the blade body of the first blade.

* * * * *